US008888296B2

(12) United States Patent
Ota et al.

(10) Patent No.: US 8,888,296 B2
(45) Date of Patent: Nov. 18, 2014

(54) LCOS PROJECTOR HAVING SIGNAL CORRECTION PROCESSING BASED ON PROJECTION LENS DISTORTION

(75) Inventors: Yutaka Ota, Kanagawa (JP); Ryuji Hada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 13/421,540

(22) Filed: Mar. 15, 2012

(65) Prior Publication Data

US 2013/0069961 A1 Mar. 21, 2013

(30) Foreign Application Priority Data

Sep. 20, 2011 (JP) ................................. 2011-204934

(51) Int. Cl.
*G03B 21/14* (2006.01)
*G09G 3/00* (2006.01)
*G06T 1/20* (2006.01)
*H04N 9/31* (2006.01)
*G09G 5/39* (2006.01)
*G06T 1/60* (2006.01)

(52) U.S. Cl.
CPC ................. *G03B 21/147* (2013.01); *G06T 1/20* (2013.01); *H04N 9/312* (2013.01); *H04N 9/3185* (2013.01); *H04N 9/3179* (2013.01); *G09G 5/39* (2013.01); *G09G 3/002* (2013.01); *H04N 9/3188* (2013.01); *G06T 1/60* (2013.01)
USPC .............................. 353/69; 345/506; 345/560

(58) Field of Classification Search
CPC .... G03B 21/005; G03B 21/006; G03B 21/14; G03B 21/147; G02F 1/0121; G02F 1/13; G02F 1/1313; G02F 1/133; G02F 1/13306; H04N 9/31; H04N 9/3102; H04N 9/312; H04N 9/3126; H04N 9/3179; H04N 9/3182; H04N 9/3185; H04N 9/3188; G06T 1/20; G06T 1/60; G09G 3/002; G09G 5/39

USPC ........... 353/31, 34, 37, 46, 48–51, 69–70, 82, 353/94, 122; 349/1, 5, 7–9; 345/506, 560
See application file for complete search history.

(56) References Cited

U.S. PATENT DOCUMENTS 6,367,933 B1 * 4/2002 Chen et al. ...................... 353/69
6,608,630 B1 * 8/2003 MacInnis et al. ............... 345/634
(Continued)

FOREIGN PATENT DOCUMENTS

JP 2001-069435 3/2001
JP 2004-032368 1/2004
(Continued)

OTHER PUBLICATIONS

Office Action dated May 13, 2014 in Japanese Patent Application No. 2011-204934.

*Primary Examiner* — Tony Ko
*Assistant Examiner* — Jori S Reilly-Diakun
(74) *Attorney, Agent, or Firm* — Knobbe Martens Olson & Bear LLP (57) ABSTRACT

A projector is provided with: an input line memory which holds an input image signal corresponding to one line; an image processor which generates an intermediate image signal correction-processed according to distortion of a projection lens, using the input image signal transferred from the input line memory; an output line memory which holds the intermediate image signal corresponding to one line; and an LCOS which guides light radiated from a light source to the projection lens in accordance with the intermediate image signal. The image processor is provided with an input supplementation buffer which stores the input image signals of a plurality of lines, an input data buffer which stores input image signals required to generate the intermediate image signal corresponding to one line, and a number-of-supplementary-lines calculator which calculates the number of supplementary lines of the input image signals.

20 Claims, 11 Drawing Sheets

(56) References Cited

U.S. PATENT DOCUMENTS

| | | | |
|---|---|---|---|
| 6,982,730 B2 * | 1/2006 | Han | 345/660 |
| 7,150,536 B2 * | 12/2006 | Inoue | 353/69 |
| 7,239,360 B2 * | 7/2007 | Bassi et al. | 348/745 |
| 7,260,271 B2 | 8/2007 | Funamoto | |
| 7,753,534 B2 * | 7/2010 | Kuno | 353/69 |
| 8,068,115 B2 * | 11/2011 | Brown et al. | 345/560 |
| 8,406,562 B2 * | 3/2013 | Bassi et al. | 382/275 |
| 8,545,026 B2 * | 10/2013 | Wang | 353/69 |
| 8,696,140 B2 | 4/2014 | Tanaka | |
| 2004/0001152 A1 | 1/2004 | Funamoto | |
| 2005/0271299 A1 | 12/2005 | Ajito et al. | |
| 2007/0046901 A1 * | 3/2007 | Kuno | 353/69 |
| 2012/0127184 A1 * | 5/2012 | Satoh et al. | 345/530 |
| 2013/0222386 A1 * | 8/2013 | Tannhauser et al. | 345/428 |
| 2013/0222776 A1 * | 8/2013 | Ishikawa | 353/121 |

FOREIGN PATENT DOCUMENTS

| | | |
|---|---|---|
| JP | 2005-347813 | 12/2005 |
| JP | 2006-053313 | 2/2006 |

* cited by examiner

LCOS PROJECTOR HAVING SIGNAL CORRECTION PROCESSING BASED ON PROJECTION LENS DISTORTION

CROSS-REFERENCE TO RELATED APPLICATION

This application is based upon and claims the benefit of priority from the Japanese Patent Application No. 2011-204934, filed on Sep. 20, 2011; the entire contents of which are incorporated herein by reference.

FIELD

An embodiment described herein relates generally to a projector, an image processing apparatus and an image processing method.

BACKGROUND

Conventionally, a projection lens of a projector is constituted by many lenses in order to suppress difference (aberration) between an ideal image (an image inputted to the projector) and an actual image (an image projected through the projector). In order to suppress chromatic aberration of magnification, however, many sets of lenses made of materials with different refractive indexes are used, and the number of lenses increases. Therefore, there are problems of increase in apparatus size and increase in manufacturing cost. Furthermore, though the material quality of the lenses is fully considered or aspheric lenses are adopted in order to suppress barrel or pincushion distortion aberration, the design cost and manufacturing cost of the lenses are increased.

Recently, in the case where distortion and the like occur in an image due to chromatic aberration of magnification or distortion aberration caused by a factor in an optical system, a method is generally used in which image processing of an input image is electrically performed as preprocessing of the optical system to give distortion in a direction opposite to the direction of the distortion caused in the optical system, to the input image in advance. For example, in the case where such distortion aberration that an image distorts into a barrel shape occurs in an optical system, correction processing is performed at a stage before the optical system to transform the image into a pincushion shape.

Since random access to an input image is required in correction processing in a conventional projector, a method has been used in which an input image corresponding to one frame is held with the use of a frame memory to access a necessary pixel. However, since a frame memory has a large capacity, there is a problem of increase in manufacture cost and apparatus size. This problem is especially remarkable when input/output of an image is restricted and a double buffer is required.

Therefore, an apparatus using a line memory instead of a frame memory is proposed in order to solve this problem. As for the apparatus conventionally proposed, reference is made only to correction processing in the case where an image is distorted in a trapezoid, and there is a problem that correction of other distortions, for example, barrel distortion or pincushion distortion is impossible, and the distortion remains in an output image.

DETAILED DESCRIPTION

A projector of an embodiment is provided with: an input line memory configured to hold an input image signal corresponding to one line; an image processor configured to generate an intermediate image signal correction-processed according to distortion of a projection lens, using the input image signal transferred from the input line memory; an output line memory configured to hold the intermediate image signal corresponding to one line; and an LCOS configured to guide light radiated from a light source to the projection lens in accordance with the intermediate image signal. The image processor is provided with an input supplementation buffer configured to store the input image signals of a plurality of lines, an input data buffer configured to store the input image signals required to generate the intermediate image signal corresponding to one line, and a number-of-supplementary-lines calculator configured to calculate the number of supplementary lines of the input image signals to be transferred from the input supplementation buffer to the input data buffer.

An embodiment will be described below with reference to drawings.

Figure 1:
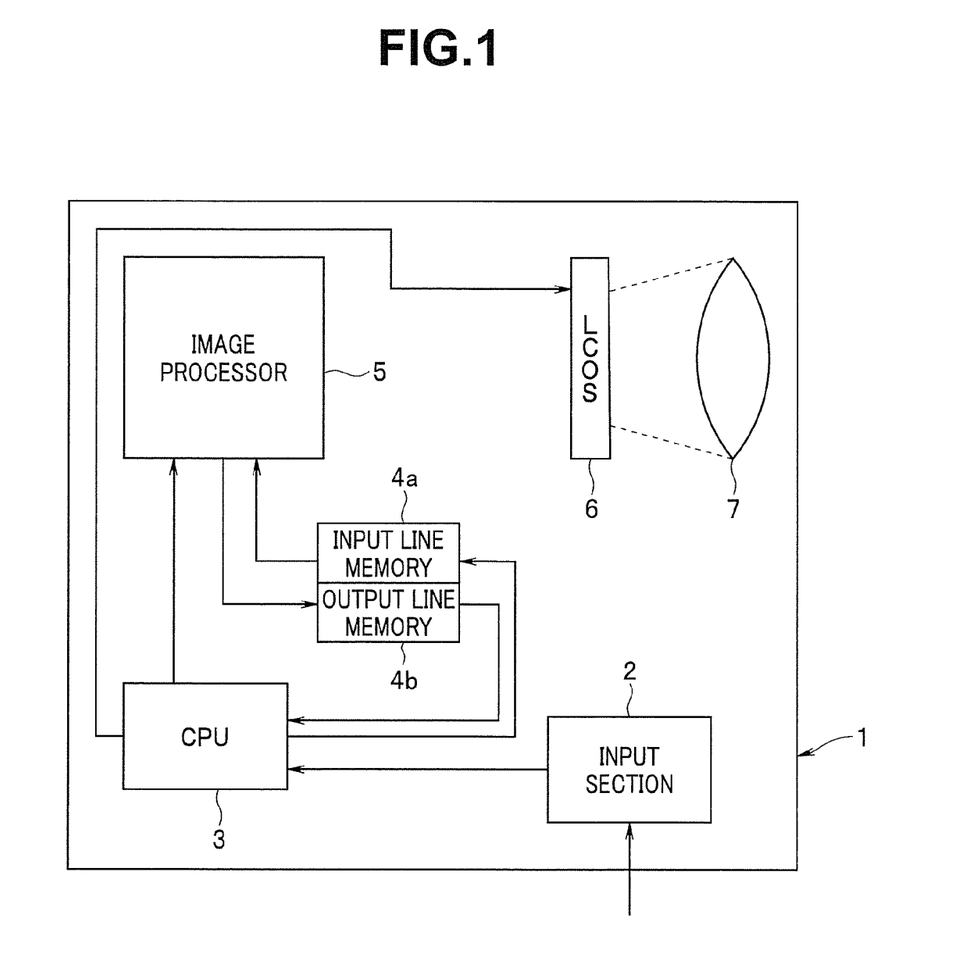
FIG. 1 is a diagram illustrating an example of a configuration of a projector according to the embodiment.

FIG. 1 is a diagram illustrating an example of a configuration of a projector according to a first embodiment. A projector 1 is provided with an input section 2 configured to input an image signal and the like constituting an image to be projected, a central processing unit (hereinafter referred to as a CPU) 3 configured to control each section inside the projector 1 to execute transmission/reception of data such as an image signal, an input line memory 4a configured to hold an input image signal corresponding to one line, an output line memory 4b configured to hold an intermediate image signal corresponding to one line, an image processor 5 configured to perform electrical image processing of an input image signal, an LCOS 6 which is a reflecting liquid-crystal panel, and a projection lens 7.

The projector 1 is also provided with a light source device, an illumination optical section provided with various element lenses, a control section configured to control the illumination optical section, and the like, though they are not shown. The projection lens 7, the illumination optical system and the like are not provided with optical techniques for correcting at least distortion aberration and chromatic aberration of magnification (for example, an achromatic lens, an aspheric lens and the like), and only lenses required to project an image are arranged. Furthermore, a power supply device not shown is connected to the projector 1 to supply necessary power to each section.

Figure 2:
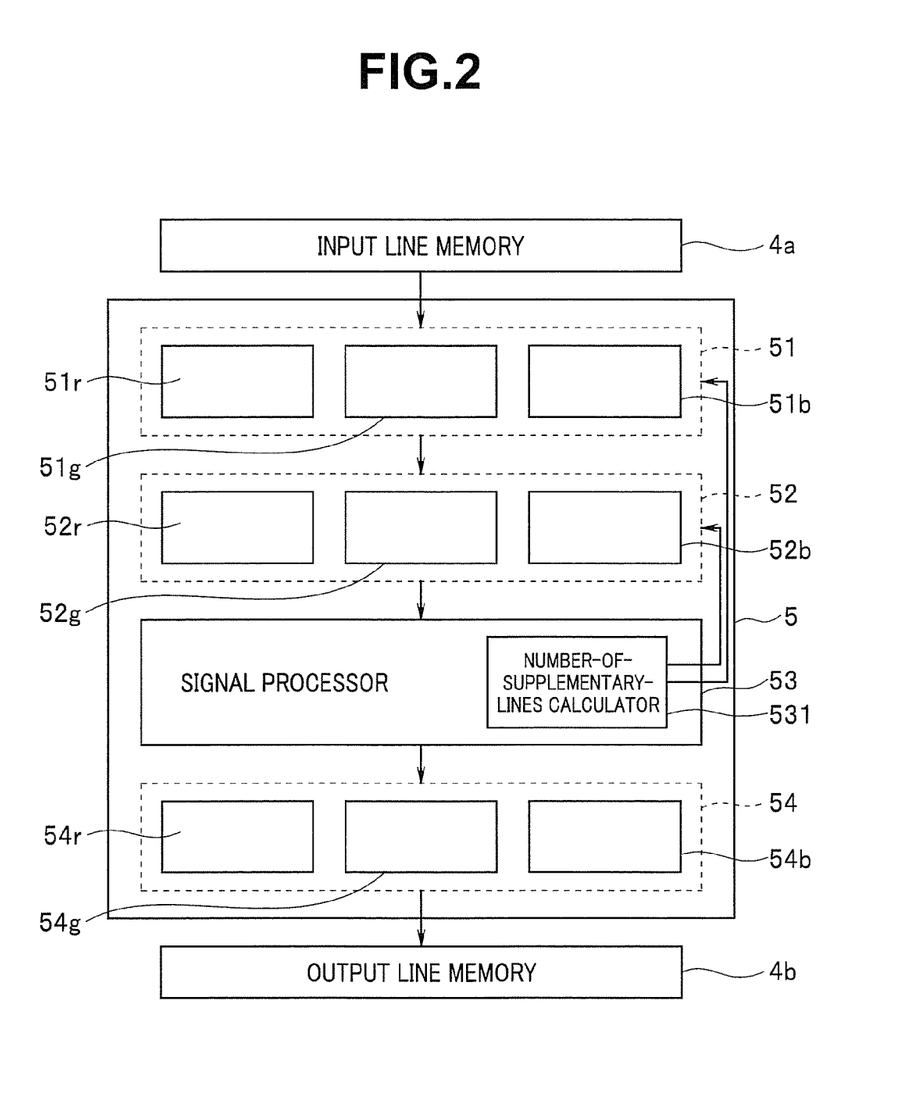
FIG. 2 is a diagram illustrating a configuration of an image processor 5.

FIG. 2 is a diagram illustrating a configuration of the image processor 5. The image processor 5 is provided with an input supplementation buffer 51 configured to hold an input image signal from the input line memory 4a, an input data buffer 52 configured to hold an input image signal related to a line which may possibly be used for correction, a signal processor 53 as an optical correction circuit for performing correction of an input image signal, and an output buffer 54 configured to successively store intermediate image signals generated by the signal processor 53 performing correction processing. The input supplementation buffer 51, the input data buffer 52 and the output buffer 54 are configured by buffers for an R image, a G image and a B image, respectively.

Each of the input supplementation buffer 51 and the input data buffer 52 is configured by a circular buffer having a capacity capable of holding image signals corresponding to a certain number of lines (for example, about 32 lines). The input supplementation buffer 51 is supplemented with an image signal corresponding to one line from the input line memory 4a each time, and, at the same time, an image signal corresponding to one line stored the earliest, among the image signals already stored, is discarded.

It is necessary that the input data buffer 52 store input image signals required for correction processing for obtaining an image signal of a line to be outputted next. This input image signals required for the correction processing do not correspond to input image signals stored in the input supplementation buffer 51 which are regularly updated. Therefore, it is necessary to read out the input image signals from the input supplementation buffer 51 appropriately to update the input data buffer 52.

Calculation of the number of supplementary lines required for the update (calculation of the number of lines of input image signals transferred from the input supplementation buffer 51 to the input data buffer 52) is performed by a number-of-supplementary-lines calculator 531 of the signal processor 53. A specific method for calculating the number of supplementary lines by the number-of-supplementary-lines calculator 531 will be described later.

The signal processor 53 transforms a position of each pixel of an input image signal to a position of each pixel of an intermediate image signal using correction equations (1) to (3) shown below. If the square of a distance from the center of an image is denoted by r2, a correction parameter is denoted by $k_x$ (x=0 to 3), horizontal-direction and vertical-direction coordinate positions of each pixel in the image before correction (a×b pixels) are denoted by $x_i$ (−2/a≤$x_i$≤2/a) and $y_i$ (−2/b≤$y_i$≤2/b), respectively, horizontal-direction and vertical-direction coordinate positions of each pixel in the image after correction (A×B pixels) are denoted by $x_o$ (−2/A≤$x_o$≤2/A) and $y_o$ (−2/B≤$y_o$≤2/B), respectively, then coordinate positions of each pixel before and after correction ($x_i$, $y_i$) and ($x_o$, $y_o$) are expressed by the following relational expressions:

$$x_i = (k_0 + k_1 \times r2 + k_2 \times r2^2 + k_3 \times r2^3) x_o \quad (1)$$

$$y_i = (k_0 + k_1 \times r2 + k_2 \times r2^2 + k_3 \times r2^3) y_o \quad (2)$$

$$r2 = x_o^2 + y_o^2 \quad (3)$$

(wherein each coordinate position is on the assumption of the center of the image being the origin.)
The correction parameter $k_x$ (x=0 to 3) differs according to colors (RGB). Therefore, in actual correction processing, appropriate parameters are substituted into the equations (1) to (3) for each of inputted R image, G image and B image to perform coordinate transformation. An intermediate image signal corresponding to one line is held in the output buffer 54 and is transferred to the output line memory 4b at regular time intervals.

Figure 3:
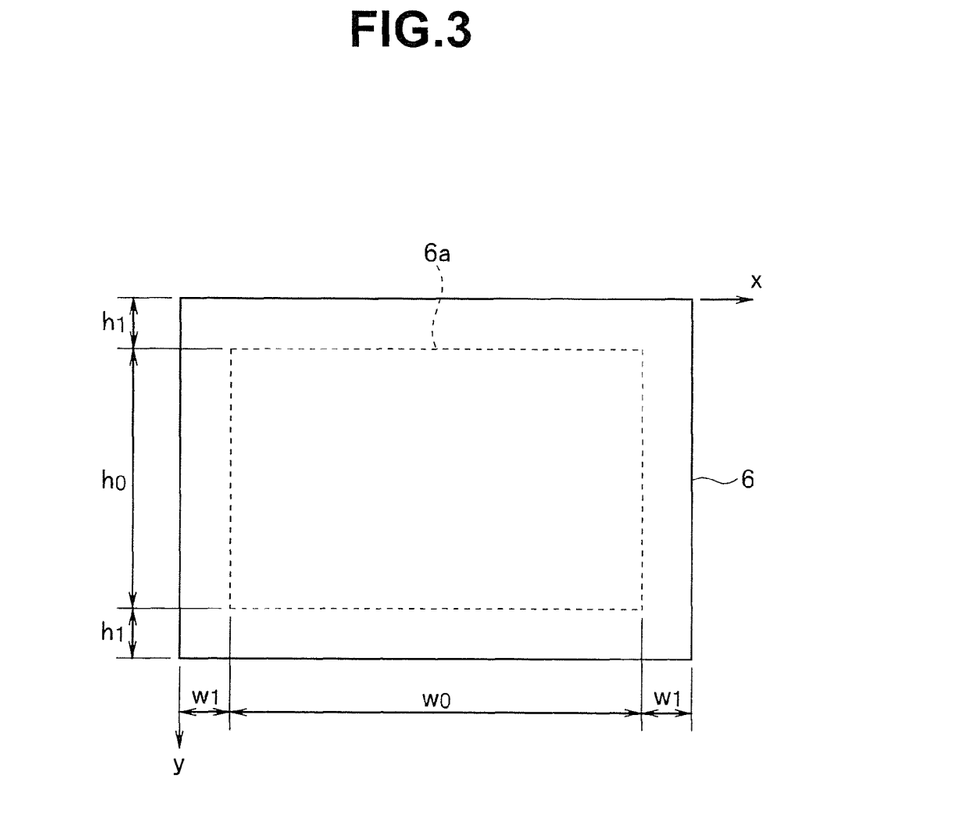
FIG. 3 is a schematic diagram illustrating a pixel area of an LCOS 6.

FIG. 3 is a schematic diagram illustrating a pixel area of the LCOS 6. The LCOS 6 is configured such that it has a pixel area obtained by adding margin areas to the left, right, top and bottom of an effective pixel area 6a of an input image signal. That is, if the effective pixel area 6a of an input image is $w_o \times h_o$, then the pixel area of the LCOS 6 is $(w_o + 2 \times w_1) \times (h_o + 2 \times h_1)$. The size of the margin areas of the LCOS 6 is determined in consideration of the distortion characteristic, distortion correction range and the like of the projection lens 7.

Next, a method for setting the capacity of the input supplementation buffer 51 and the input data buffer 52 and a specific method for calculating the number of lines required for update by the number-of-supplementary-lines calculator 531 will be described.

Figure 4A:
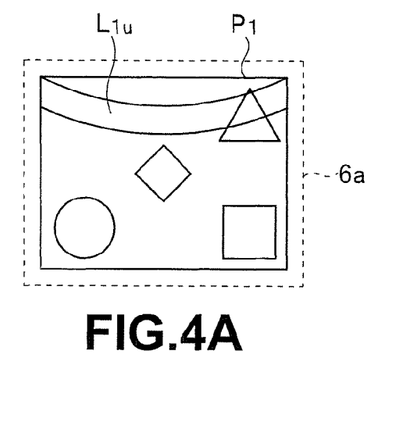
FIGS. 4A, 4B, 4C, 4D, 4E and 4F are image diagrams illustrating movement of pixels by correction.
Figure 4B:
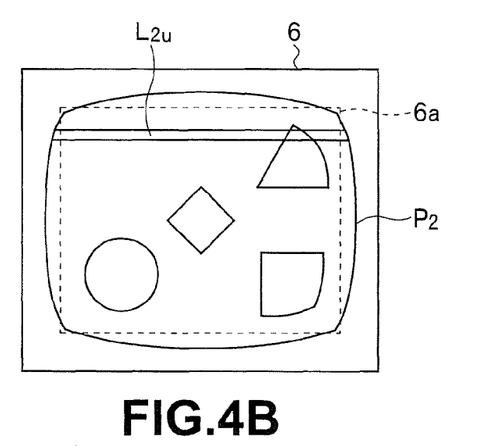
Figure 4C:
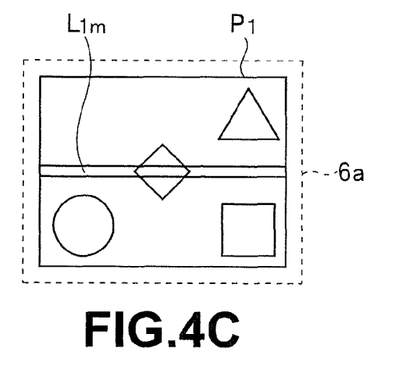
Figure 4D:
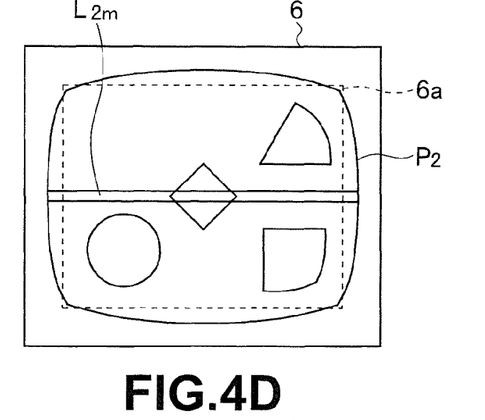
Figure 4E:
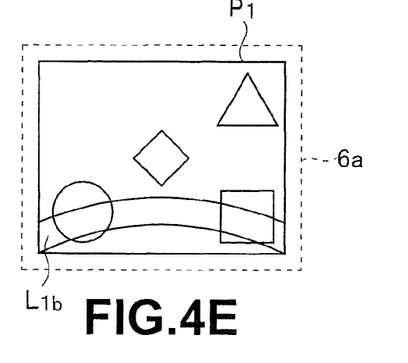
Figure 4F:
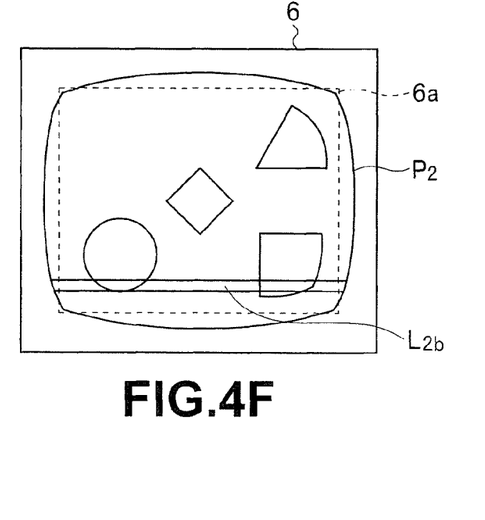

FIGS. 4A, 4B, 4C, 4D, 4E and 4F are image diagrams illustrating movement of pixels by correction. FIGS. 4A and 4B show an image before and after correction for a line at an upper part of an image, FIGS. 4C and 4D show the image before and after the correction for a line at the center of the image, and FIGS. 4E and 4F show the image before and after the correction for a line at a lower part of the image. That is, FIGS. 4A, 4C and 4E show an input image $P_1$ of the same frame before correction, and FIGS. 4B, 4D and 4F show an intermediate image $P_2$ of the same frame after the correction. Here, description will be made on a case where, when pincushion distortion occurs in an optical system, barrel distortion in an opposite direction is given to an image by correction.

Pixels arranged on a line $L_{2u}$ positioned at the upper part of the image as shown in FIG. 4B, in the intermediate image $P_2$, are constituted by pixels arranged on an area $L_{1u}$ positioned at the upper part of the image as shown in FIG. 4A, in the input image $P_1$. That is, when the signal processor 53 calculates pixels constituting the line $L_{2u}$, it is necessary to hold pixels of a line which includes the area $L_{1u}$ in the input image $P_1$ should be held in the input data buffer 52.

Pixels arranged on a line $L_{2m}$ positioned at the center of the image as shown in FIG. 4D, in the intermediate image $P_2$, are constituted by pixels arranged on an area $L_{1m}$ positioned at the center of the image as shown in FIG. 4C, in the input image $P_1$. That is, when the signal processor 53 calculates pixels constituting the line $L_{2m}$, it is necessary to hold pixels of a line which includes the area $L_{1m}$ in the input image $P_1$ should be held in the input data buffer 52.

Furthermore, pixels arranged on a line $L_{2b}$ positioned at the lower part of the image as shown in FIG. 4F, in the intermediate image $P_2$, are constituted by pixels arranged on a line $L_{1b}$ positioned at the lower part of the image as shown in FIG. 4E, in the input image $P_1$. That is, when the signal processor 53 calculates pixels constituting the line $L_{2b}$, it is necessary to hold pixels of a line which includes the area $L_{1b}$ in the input image $P_1$ should be held in the input data buffer 52.

As described above, when pixels positioned on the line close to the center of the intermediate image $P_2$, only little distortion occurs. Therefore, it is sufficient to hold pixels of one to several lines positioned at the center of the input image $P_1$, in the input data buffer 52. On the other hand, when pixels positioned on a line far from the center of the intermediate image $P_2$ (the line at the upper part of the image or the line at the lower part of the image), much distortion occurs. Therefore, pixels of a plurality of lines positioned at the upper part or lower part of the input image $P_1$ (many lines in comparison with the number of lines required to be held in the case of calculating pixels positioned on the line close to the center of the intermediate image $P_2$) are held in the input data buffer 52.

Therefore, the input data buffer 52 is required to have a capacity enough to hold the number of lines $H_o$ of the input image $P_1$ required to calculate pixels of a line positioned at the top of the intermediate image $P_2$ and the number of lines $M_a$ for calculating the pixels of a line to be calculated next (the line positioned on the second from the top of the intermediate image $P_2$). The number of lines of the input image $P_1$ required to calculate pixels of a line positioned at the bottom of the intermediate image $P_2$ is the same as the number of lines $H_o$ of the input image $P_1$ required to calculate the number of pixels of the line positioned at the top.

If the number of lines of the input image $P_1$ and the distortion rate in the optical system are denoted by H and $X_d\%$, respectively, $H_o$ is expressed by the following equation (4):

$$H_o = H \times ((X_d/2)/100) \quad (4)$$

If the coordinates of a principal point, which is the optical center of the intermediate image $P_2$, is denoted by $(P_x, P_y)$, then $M_a$ can be a value obtained by adding 2 to difference $y_i$ calculated for pixels at two points $(-P_x, -P_r)$ and $(-P_x, -P_y+1)$ after correction. The reason for adding 2 is as follows. The value of $y_i$ calculated for each pixel is often a value with a fractional part. It is, however, necessary to approximate the value to an integer value in order to cause the value to correspond to coordinates of discretized pixels held in the input data buffer 52, and the maximum value of the difference $y_i$ calculated for each pixel is 2.

A method for determining the capacity of the input data buffer 52 will be described with the use of specific numerical values. A case will be considered where the principal point of the input image $P_1$, which is an FWVGA image (854×480 pixels), is the center of the image in a projector with a distortion rate of 10%. Normalized correction coefficients are assumed to be $k_0=1$, $k_1=-0.01$, $k_2=-0.05$ and $k_3=0.02$.

First, for $H_o$, by substituting the above necessary numerical values into the equation (4), the following equation is obtained:

$$H_o = 480 \times ((10/2)/100) = 24 \quad (5)$$

Next, for pixels at two points $(-427, -240)$ and $(-427, -239)$ after correction, $y_i$ is calculated by substituting the above necessary numerical values into the equations (2) and (3). For $(-427, -240)$, the following equations are obtained:

$$r2 = (-1.0)^2 + (-240/427)^2 = 1.315911 \quad (6)$$

$$y_i = ((1+(-0.01) \times 1.315911 + (-0.05) \times (1.315911)^2 + 0.02 \times (1.315911)^3) \times (-240) = -226.9999368 \quad (7)$$

Next, for $(-427, -239)$, the following equations are obtained:

$$r2 = (-1.0)^2 + (-239/427)^2 = 1.313286 \quad (8)$$

$$y_i = ((1+(-0.01) \times 1.313286 + (-0.05) \times (1.313286)^2 + 0.02 \times (1.313286)^3) \times (-239) = -226.08181578 \quad (9)$$

Therefore, because it is a value obtained by adding 2 to the difference between the solutions of the equations (7) and (9), $M_a$ is expressed by the following equation:

$$M_a = -226.08181578 - (-226.9999368) + 2 = 2.9181202 \quad (10)$$

For the reason of implementation of memory, $M_a$ is 3, and the maximum number of lines to be held in the input data buffer 52 is: 24+3=27 lines. Here, since the input data buffer 52 is configured by a circular buffer, its capacity is required to be of a numerical value expressed by a power of 2 which is not below the number of bytes of (the number of lines)×(the width of the input image $P_1$). In the above example, therefore, the capacity of the input data buffer 52 is 32 KB. Similarly, the capacity of the input supplementation buffer 51 is also 32 KB.

Next, a method for calculating the number of lines required for update by the number-of-supplementary-lines calculator 531 will be described. The number-of-supplementary-lines calculator 531 holds a line number $M_o$ of an output line to be corrected next, a maximum line number C among input image signals currently read in the input data buffer 52 and a maximum line number M under which an image signal actually used for correction is included among the input image signals stored in the input data buffer 52, for an output line corrected last.

The line number is a number for identifying each of a plurality of lines constituting one frame. For example, in the case where the input image $P_1$ is an FWVGA image (854×480 pixels), line numbers of 0, 1, 2, . . . , 478 and 479 are given, from the line at the top of an image in that order.

First, a calculation method in the case where the line number $M_o$ of an output line to be corrected is 0, that is, correction of the first line of a new frame is performed will be described. Since input image signals currently stored in the input data buffer 52 are for a previous frame, they are not used for correction performed subsequently. Therefore, the input image signals stored in the input data buffer 52 are discarded and updated with input image signals of a new frame. In the case of correction of a new frame, at least data corresponding to the number of lines required for update is stored in the input data buffer 52. In the example described before, the data corresponding to 27 lines is stored. All lines which can be stored in the input data buffer 52 may be updated.

When the line number $M_o$ of an output line to be corrected next is a number other than 0, that is, when correction of a line of the same frame is performed, input image signals currently stored in the input data buffer 52 can be also used, and, therefore, the number of shortage input image signals can be supplemented from the input supplementation buffer 51 to the input data buffer 52. In order to perform correction of the next output line, it is necessary that input image signals with line numbers up to a line number obtained by adding the number of lines ($=M_a$) to be added to calculate the pixels of the line to be corrected next, to the maximum line number M under which an image signal actually used for correction of a previous output line is included, be stored in the input data buffer 52. Here, input image signals up to the line number C have already been stored in the input data buffer 52. Therefore, the number of lines required for update, that is, the number of supplementary lines to the input data buffer 52 is calculated by $M+M_a-C$.

Next, an operation of the projector 1 in this embodiment will be described. Here, description will be made on an operation performed after an input image signal is transferred from the input line memory 4a to the image processor 5 and until the signal is outputted to the output line memory 4b as an intermediate image signal after receiving correction processing.

Figure 5:
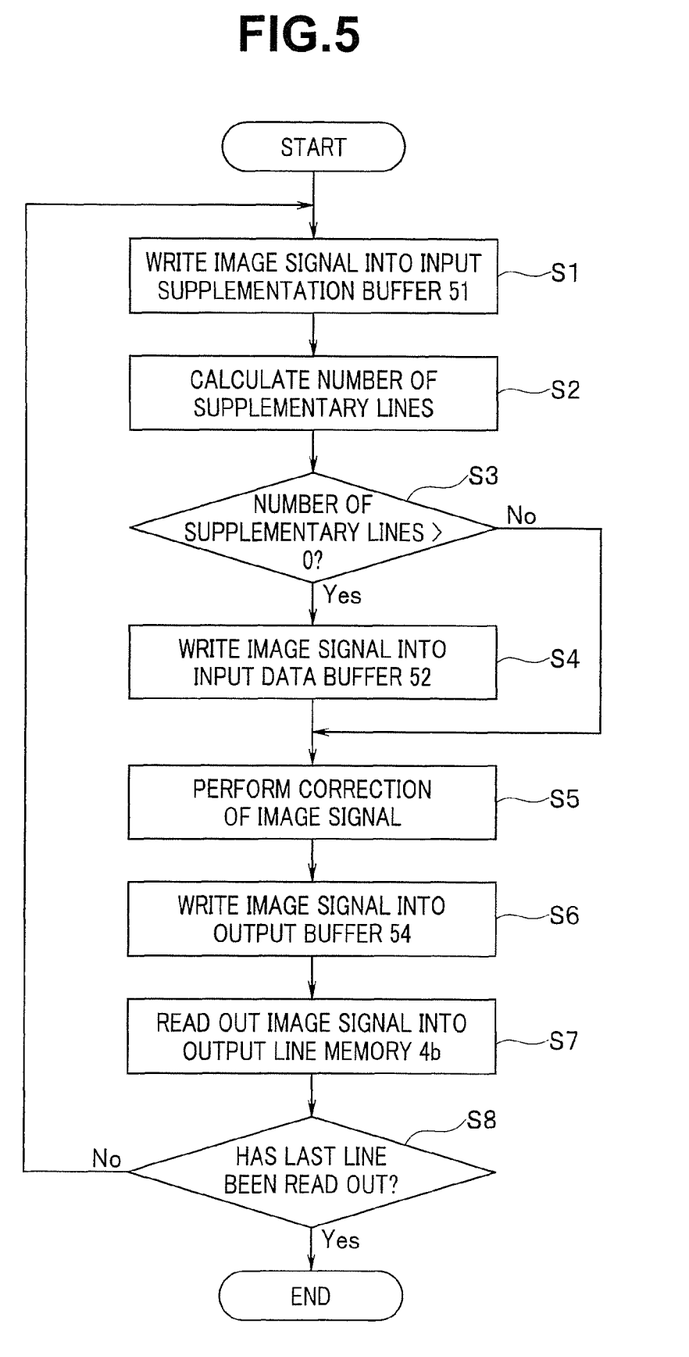
FIG. 5 is a flowchart illustrating a flow of processing of an image signal in the image processor 5.

FIG. 5 is a flowchart illustrating a flow of processing of an image signals corresponding to one frame in the image processor 5, the input line memory 4a and the output line memory 4b. An input image is configured by superimposing a plurality of images, for example, an R image, a G image and a B image, and the image processor 5 performs correction processing of an input image signal of each image. Here, first, description will be made on an operation of performing correction processing of an input image signal of one image (for example, an R image) constituting an input image.

First, an input image signal corresponding to one line is written from the input line memory 4a into the input supplementation buffer 51 (S1). However, if space for writing the input image signal is not left any more, an input image signal corresponding to one line written earliest is discarded. When a line at the top of the frame is corrected, S1 is repeatedly executed so as to store input image signals corresponding to the number of lines required for the correction.

An input image signal corresponding to one line is written into the input line memory 4a at regular time intervals via the input section 2 and the CPU 3. As for timing of disintegrating an input image signal into input image signals for R, G and B, the disintegration may be performed by the input section 2 or the CPU 3 before the input image signal is written into the input line memory 4a or may be performed when the input image signal is written from the input line memory 4a into the input supplementation buffer 51. The timing can be selected according to implementation.

Next, the number-of-supplementary-lines calculator 531 calculates the number of lines to be supplemented from the input supplementation buffer 51 to the input data buffer 52 (S2). A specific method for calculating the number of supplementary lines is as described above.

If the number of supplementary lines is 1 or more as a result of calculation (S3: Yes), input image signals for $(M+M_a-C)$ lines starting from line number $(C+1)$ are written from the input supplementation buffer 51 into the input data buffer 52 (S4). However, if space for writing an input image signals is not left any more, input image signals corresponding to $(M+M_a-C)$ lines written earliest are discarded.

On the other hand, if the number of supplementary lines is 0 as a result of calculation (S3: No), the flow proceeds to S5 because it is not necessary to transfer an input image signal from the input supplementation buffer 51 to the input data buffer 52.

Next, correction processing is performed with the use of an input image signal stored in the input data buffer 52 to generate an intermediate image signal corresponding to one line to be outputted (S5). Specific correction processing for transforming each pixel position of the input image signal to each pixel position of the intermediate image signal is performed with the use of the equations (1) to (3) as described above.

The generated intermediate image signal is written into the output data buffer 54 (S6) and read out into the output line memory 4b (S7).

If the data read from the output data buffer 54 is not data of the last line (S8: No), the flow returns to S1 and repeats S1 to S7 until processing corresponding to one frame ends. On the other hand, generation of an intermediate image signal of the last line has ended, and reading into the output line memory 4b has been completed (S8: Yes), the correction processing corresponding to the one frame ends. In the case of performing correction processing of a new frame, all data in the input supplementation buffer 51 is discarded, and the process from S1 to S8 is performed.

A flow of a process of performing correction of three image signals of an R image signal, a G image signal and a B image signal to generate and output an intermediate image signal, which is obtained by pipelining the above process, will be described. FIGS. 6, 7, 8, 9, 10 and 11 are schematic diagrams illustrating a flow of pipeline processing of an image signal in the image processor 5, the input line memory 4a and the output line memory 4b. FIGS. 6, 7, 8, 9, 10 and 11 show six continuous stages of the pipeline processing, respectively.

Figure 6:
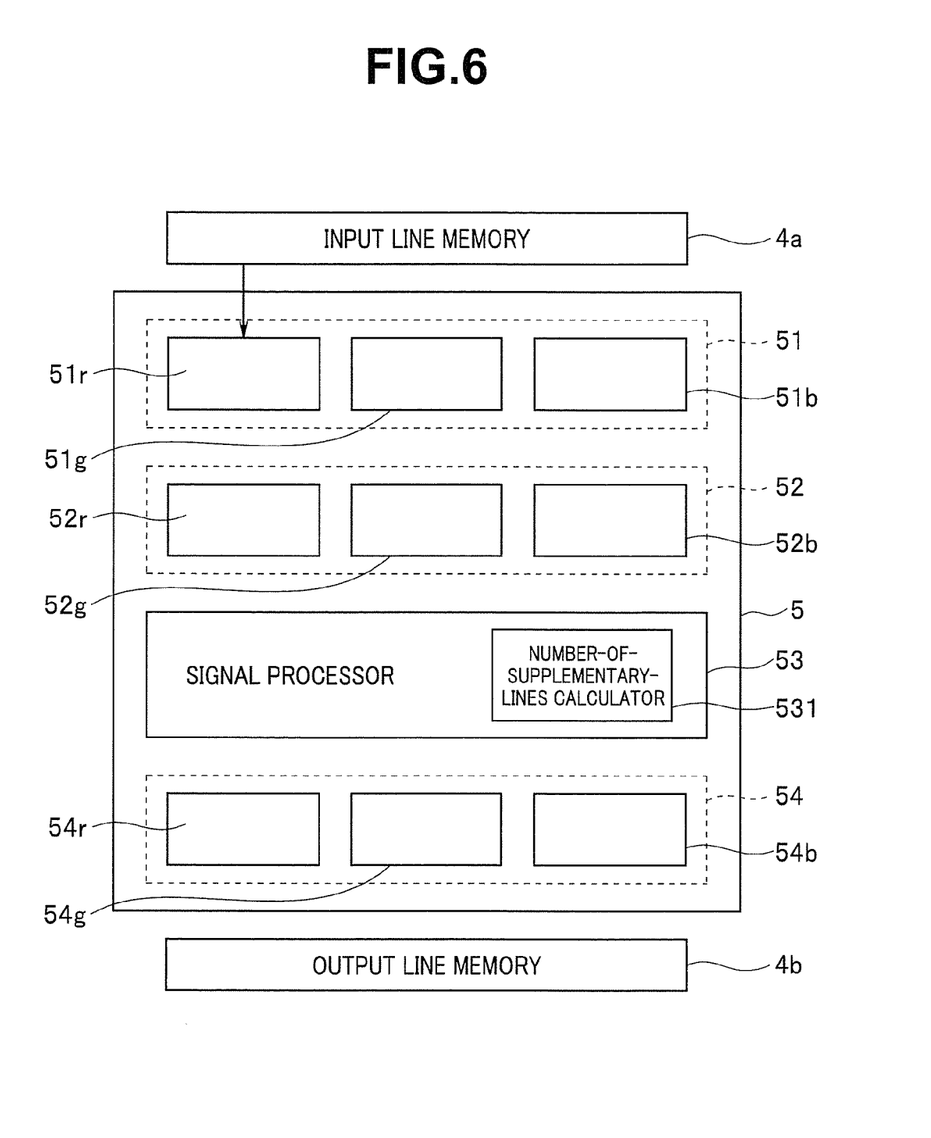
FIG. 6 is a schematic diagram illustrating a flow of pipeline processing of an image signal in the image processor 5.

Here, it is assumed that, before the stage shown in FIG. 6, input image signals corresponding to the number of lines obtained by subtracting 1 from the number of lines which can be stored in each input supplementation buffer 51 have been already written from the input line memory 4a in the input supplementation buffer 51. For example, if the capacity of the input supplementation buffer 51 is 32 KB, and input image signals corresponding to 32 lines can be stored, then it is assumed that input image signals corresponding to 31 lines have already been written in the input supplementation buffer 51 before the stage in FIG. 6.

First, in the stage shown in FIG. 6, an input image signal of an R image corresponding to one line is written from the input line memory 4a into an input supplementation buffer for R image 51r (corresponding to S1 in FIG. 5).

Figure 7:
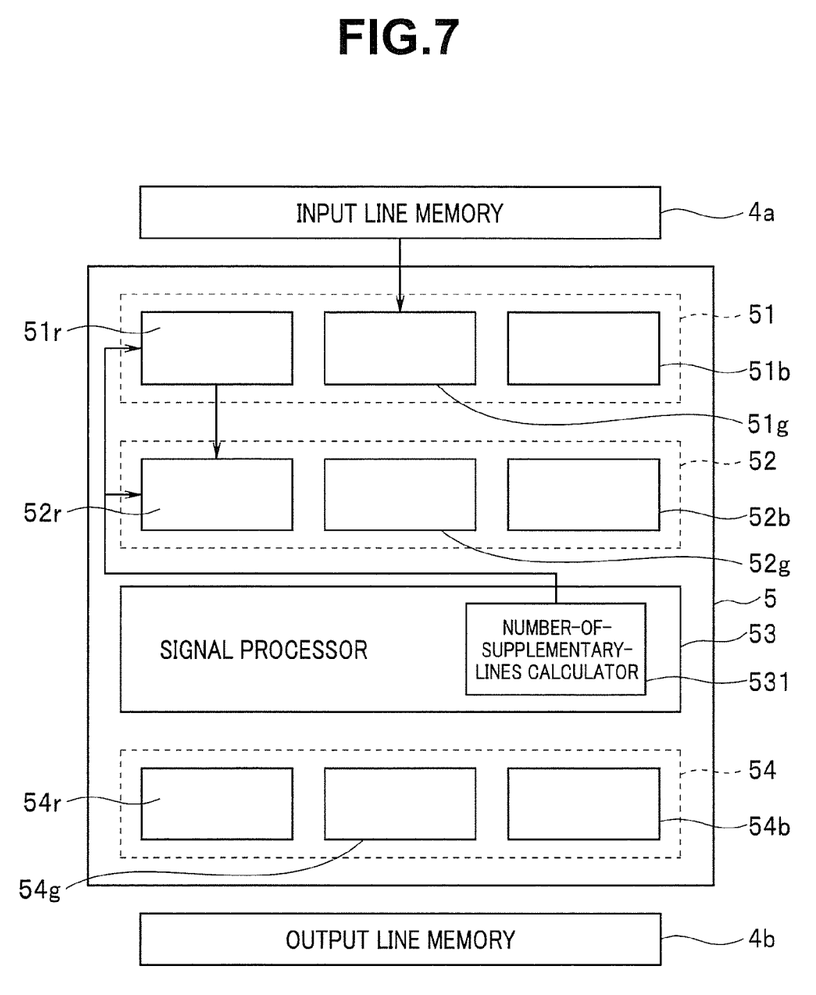
FIG. 7 is a schematic diagram illustrating a flow of pipeline processing of an image signal in the image processor 5.

In the stage shown in FIG. 7, the number-of-supplementary-lines calculator 531 calculates the number of lines to be supplemented from the input supplementation buffer for R image 51r to an input data buffer for R image 52r, and input image signals are transferred in accordance with a result (corresponding to S2 to S4 in FIG. 5). At the same time, an input image signal of a G image corresponding to one line is written from the input line memory 4a into an input supplementation buffer for G image 51g (corresponding to S1 in FIG. 5).

Figure 8:
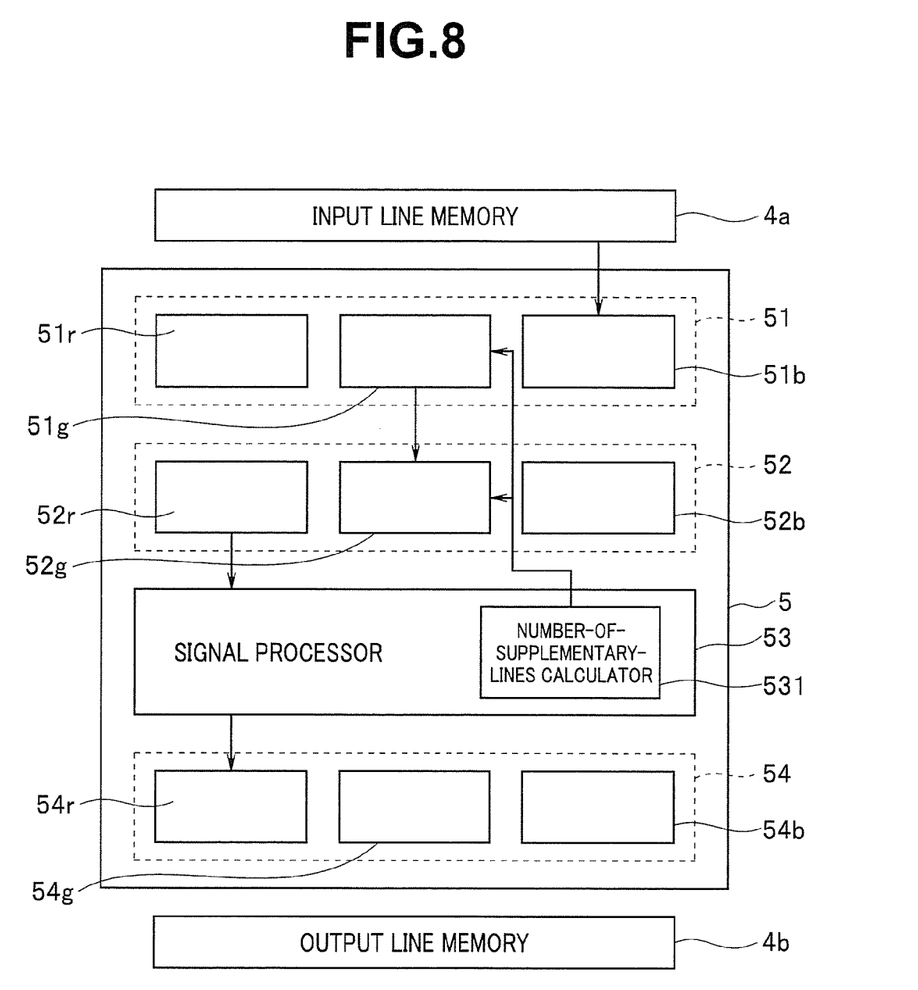
FIG. 8 is a schematic diagram illustrating a flow of pipeline processing of an image signal in the image processor 5.

In the stage shown in FIG. 8, the signal processor 53 performs correction processing using the input image signals stored in the input data buffer for R image 52r to generate an intermediate image signal for R image corresponding to one line. The generated intermediate image signal for R image is written into an output data buffer for R image 54r (corresponding to S5 and S6 in FIG. 5). At the same time, the number-of-supplementary-lines calculator 531 calculates the number of lines to be supplemented from the input supplementation buffer for G image 51g to an input data buffer for G image 52g, and input image signals are transferred in accordance with a result (corresponding to S2 to S4 in FIG. 5). At the same time, an input image signal of a B image corresponding to one line is written from the input line memory 4a into an input supplementation buffer for B image 51b (corresponding to S1 in FIG. 5).

Figure 9:
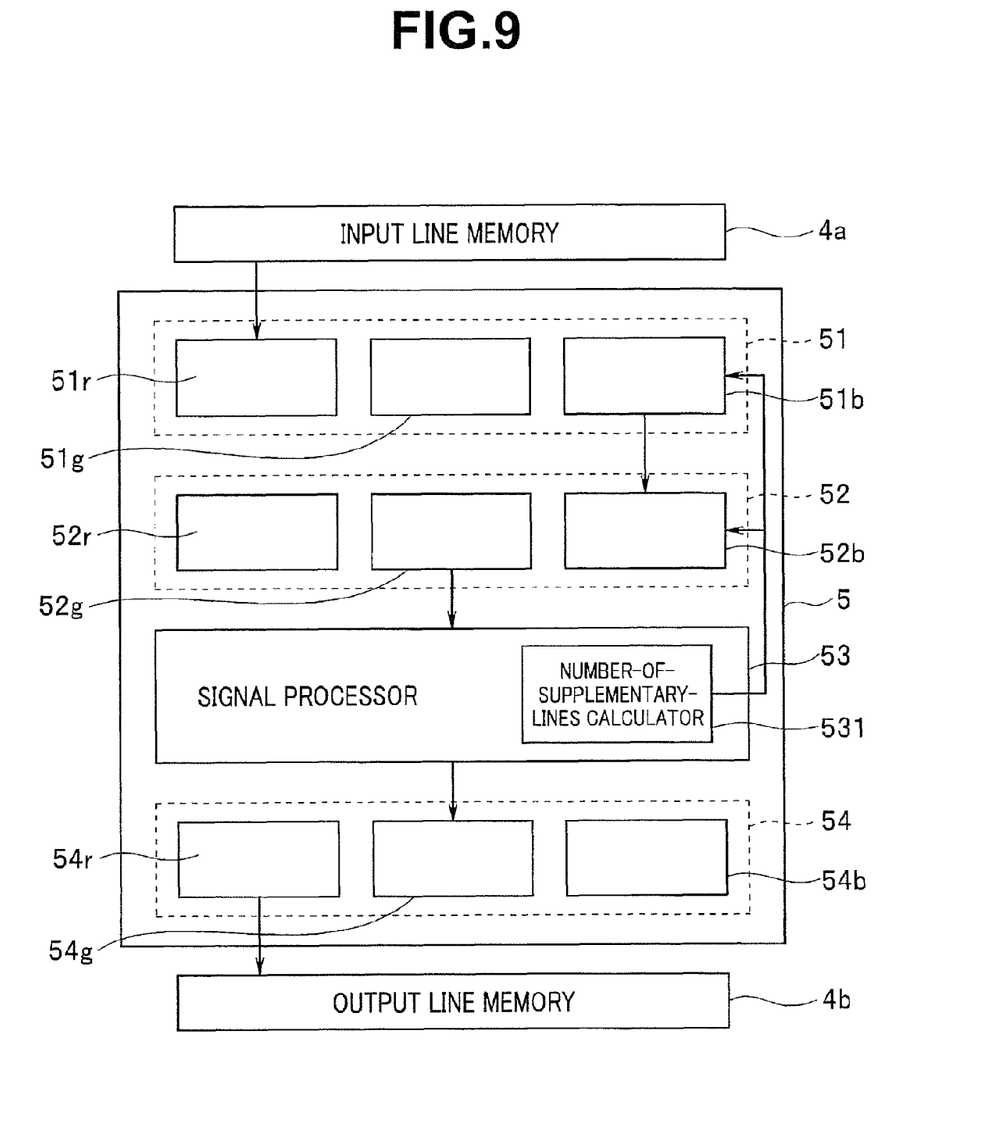
FIG. 9 is a schematic diagram illustrating a flow of pipeline processing of an image signal in the image processor 5.

In the stage shown in FIG. 9, the intermediate image signal for R image stored in the output data buffer for R image 54r is read out into the output line memory 4b, and an input image signal for R image corresponding to a next one line is written from the input line memory 4a into the input supplementation buffer for R image 51r (corresponding to S7, S8 and S1 in FIG. 5). At the same time, the signal processor 53 performs correction processing using the input image signals stored in the input data buffer for G image 52g to generate an intermediate image signal for G image corresponding to one line. The generated intermediate image signal for G image is written into an output data buffer for G image 54g (corresponding to S5 and S6 in FIG. 5). At the same time, the number-of-supplementary-lines calculator 531 calculates the number of lines to be supplemented from the input supplementation buffer for B image 51b to an input data buffer for B image 52b, and input image signals are transferred in accordance with a result (corresponding to S2 to S4 in FIG. 5).

Figure 10:
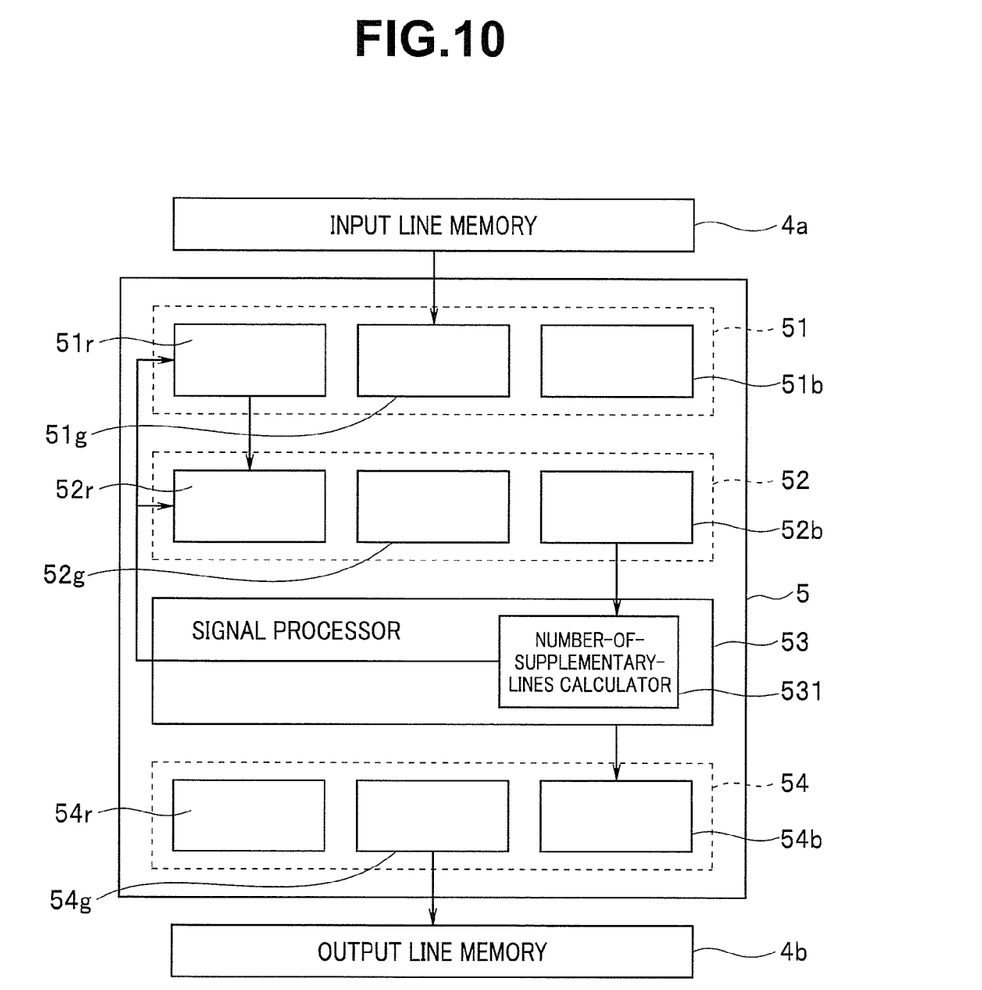
FIG. 10 is a schematic diagram illustrating a flow of pipeline processing of an image signal in the image processor 5.

In the stage shown in FIG. 10, the number-of-supplementary-lines calculator 531 calculates the number of lines to be supplemented from the input supplementation buffer for R image 51r to the input data buffer for R image 52r, and input image signals are transferred in accordance with a result (corresponding to S2 to S4 in FIG. 5). At the same time, the intermediate image signal for G image stored in the output data buffer for G image 54g is read out into the output line memory 4b, and an input image signal for G image corresponding to a next one line is written from the input line memory 4a into the input supplementation buffer for G image

51g (corresponding to S7, S8 and S1 in FIG. 5). At the same time, the signal processor 53 performs correction processing using the input image signals stored in the input data buffer for B image 52b to generate an intermediate image signal for B image corresponding to one line. The generated intermediate image signal for B image is written into an output data buffer for B image 54b (corresponding to S5 and S6 in FIG. 5).

Figure 11:
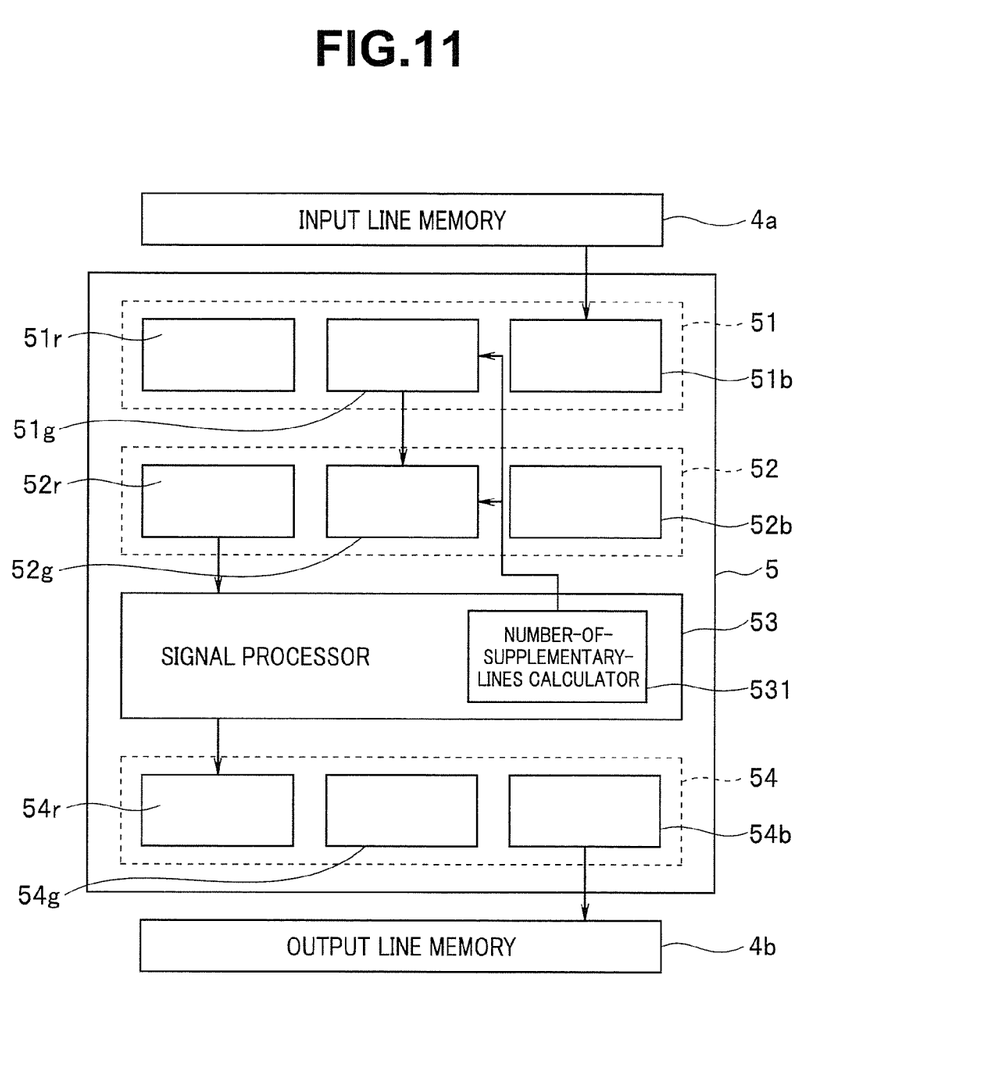
FIG. 11 is a schematic diagram illustrating a flow of pipeline processing of an image signal in the image processor 5.

In the stage shown in FIG. 11, the signal processor 53 performs correction processing using the input image signals stored in the input data buffer for R image 52r to generate an intermediate image signal for R image corresponding to one line. The generated intermediate image signal for R image is written into the output data buffer for R image 54r (corresponding to S5 and S6 in FIG. 5). At the same time, the number-of-supplementary-lines calculator 531 calculates the number of lines to be supplemented from the input supplementation buffer for G image 51g to the input data buffer for G image 52g, and input image signals are transferred in accordance with a result (corresponding to S2 to S4 in FIG. 5). At the same time, the intermediate image signal for B image stored in the output data buffer for B image 54b is read out into the output line memory 4b, and an input image signal for B image corresponding to a next one line is written from the input line memory 4a into the input supplementation buffer for B image 51b (corresponding to S7, S8 and S1 in FIG. 5).

After the stage shown in FIG. 11, the stages shown in FIGS. 9, 10 and 11 are repeatedly executed until correction processing of all input image signals written from the input line memory 4a ends and intermediate image signals are read out into the output line memory 4b.

The maximum time required for each stage of the above pipeline processing is expressed by $1/(F \times H \times 3)$ wherein the frame rate and the number of lines of an input image are denoted by F and H. In the case of performing correction of the first output line of a certain frame, it is necessary that the input supplementation buffer 51 be filled with input image signals corresponding to the number of lines required. For example, in the example described before, if the number of lines which can be written in the input supplementation buffer 51 is 32, then it is necessary that at least 27 input lines with line numbers 0 to 26 be stored in the input supplementation buffer 51 to perform correction processing for obtaining an output line with a line number 0. In addition to storage of only the minimum number of input lines (27) required for correction processing, storage of 32 input lines filling the capacity of the input supplementation buffer 51 is also possible.

As shown in FIG. 6, processing of writing one line from the input line memory 4a into the input supplementation buffer 51 is performed at one stage. An input image signal is constituted by three of R, G and B image signals, and it is necessary to perform the processing in FIG. 6 for each of the image signals line by line until the input supplementation buffer 51 is filled. Therefore, latency after an input line with the line number 0 is written from the input line memory 4a into the input supplementation buffer 51 until an output line with the line number 0 is read out into the output line memory 4b is: (the number of lines stored in the input supplementation buffer 51)$\times 3 \times (1/(F \times H \times 3))$ or more.

Thus, correction processing of input image signals into the projector 1 is successively performed, and an intermediate image signal which is given a distortion characteristic the direction of which is opposite to that of distortion aberration caused in the projection lens 7 is outputted to the LCOS 6 via the CPU 3.

As described above, in this embodiment, for correction processing of an input image signal in which distortion has occurred, input image signals written from the input line memory 4a line by line are accumulated in the input supplementation buffer 51 until a certain number of lines are accumulated, and the number of lines required to calculate a next output line is calculated in advance, and input image signals corresponding to the number of lines are written in the input data buffer 52. Correction processing is performed with the use of the input image signals stored in the input data buffer 52 to generate and output an intermediate image signal corresponding to one line. By performing this series of processings for each line, it is possible to use not a frame memory but the input line memories 4a and 4b as input/output memories for image signals for the image processor 5. Therefore, it is possible to suppress manufacturing cost and realize a compact apparatus.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A LCOS projector having signal correction processing based on projection lens distortion comprising:
   an input line memory configured to hold an input image signal corresponding to one line;
   an image processor configured to generate an intermediate image signal correction-processed according to distortion of a projection lens, using the input image signal transferred from the input line memory;
   an output line memory configured to hold the intermediate image signal corresponding to one line; and
   an LCOS configured to guide the intermediate image signal to the projection lens;
   wherein the image processor comprises an input supplementation buffer configured to store the input image signals of a plurality of lines, an input data buffer configured to store the input image signals required to generate the intermediate image signal corresponding to one line, and a number-of-supplementary-lines calculator configured to calculate a number of supplementary lines of the input image signals to be transferred from the input supplementation buffer to the input data buffer.

2. The projector according to claim 1, wherein the number-of-supplementary-lines calculator calculates the number of supplementary lines each time one line of the intermediate image signal is generated, and the input supplementation buffer transfers the input image signals corresponding to the number of supplementary lines to the input data buffer.

3. The projector according to claim 2, wherein the input image signal includes R, G and B signals and is processed by pipelining.

4. The projector according to claim 1, wherein the number-of-supplementary-lines calculator calculates the number of supplementary lines on a basis of a first line position of the input image signal stored in the input data buffer, a second line position of the input image signal used for generating one line of the intermediate image signal, and a maximum difference between a third line position of the input image signal used for generation of a first line of the intermediate image signal and a fourth line position of the input image signal used for generation of a second line adjacent to the first line of the intermediate image signal.

5. The projector according to claim 4, wherein the number-of-supplementary-lines calculator calculates the number of supplementary lines each time one line of the intermediate image signal is generated, and the input supplementation buffer transfers input image signals corresponding to the number of supplementary lines to the input data buffer.

6. The projector according to claim 5, wherein the input image signal includes R, G and B signals and is processed by pipelining.

7. The projector according to claim 1, wherein the image processor comprises a signal processor configured to generate the intermediate image signal correction-processed according to distortion of the projection lens line by line, using a plurality of the input image signals stored in the input data buffer.

8. The projector according to claim 7, wherein the number-of-supplementary-lines calculator calculates the number of supplementary lines on a basis of a first line position of the input image signal stored in the input data buffer, a second line position of the input image signal used for generating one line of the intermediate image signal, and a maximum difference between a third line position of the input image signal used for generation of a first line of the intermediate image signal and a fourth line position of the input image signal used for generation of a second line adjacent to the first line of the intermediate image signal.

9. The projector according to claim 8, wherein the number-of-supplementary-lines calculator calculates the number of supplementary lines each time one line of the intermediate image signal is generated, and the input supplementation buffer transfers input image signals corresponding to the number of supplementary lines to the input data buffer.

10. The projector according to claim 9, wherein the input image signal includes R, G and B signals and is processed by pipelining.

11. An image processing apparatus comprising:
    an input supplementation buffer configured to store input image signals of a plurality of lines;
    an input data buffer configured to store input image signals required to generate an intermediate image signal corresponding to one line, the input image signals being transferred from the input supplementation buffer;
    a number-of-supplementary-lines calculator configured to calculate a number of supplementary lines of input image signals to be transferred from the input supplementation buffer to the input data buffer; and
    a signal processor configured to generate the intermediate image signal correction-processed according to distortion of a projection lens line by line, using the plurality of input image signals stored in the input data buffer.

12. The image processing apparatus according to claim 11, wherein the number-of-supplementary-lines calculator calculates the number of supplementary lines each time one line of the intermediate image signal is generated, and the input supplementation buffer transfers input image signals corresponding to the number of supplementary lines to the input data buffer.

13. The image processing apparatus according to claim 12, wherein the input image signal includes R, G and B signals and is processed by pipelining.

14. The image processing apparatus according to claim 11, wherein the number-of-supplementary-lines calculator calculates the number of supplementary lines on a basis of a first line position of the input image signal stored in the input data buffer, a second line position of the input image signal used for generating one line of the intermediate image signal, and a maximum difference between a third line position of the input image signal used for generation of a first line of the intermediate image signal and a fourth line position of the input image signal used for generation of a second line adjacent to the first line of the intermediate image signal.

15. The image processing apparatus according to claim 14, wherein the number-of-supplementary-lines calculator calculates the number of supplementary lines each time one line of the intermediate image signal is generated, and the input supplementation buffer transfers input image signals corresponding to the number of supplementary lines to the input data buffer.

16. The image processing apparatus according to claim 15, wherein the input image signal includes R, G and B signals and is processed by pipelining.

17. An image processing method comprising:
    storing input image signals of a plurality of lines in an input supplementation buffer;
    calculating a number of supplementary lines of the input image signals to be transferred from the input supplementation buffer to an input data buffer holding an input image signal required to generate an intermediate image signal corresponding to one line;
    transferring the input image signals corresponding to the number of supplementary lines from the input supplementation buffer to store the input image signals into the input data buffer; and
    generating the intermediate image signal correction-processed according to distortion of a projection lens line by line, using the plurality of input image signals stored in the input data buffer.

18. The image processing method according to claim 17, further comprising: calculating the number of supplementary lines on a basis of a first line position of the input image signal stored in the input data buffer, a second line position of the input image signal used for generating one line of the intermediate image signal, and a maximum difference between a third line position of the input image signal used for generation of a first line of the intermediate image signal and a fourth line position of the input image signal used for generation of a second line adjacent to the first line of the intermediate image signal.

19. The image processing method according to claim 18, further comprising: calculating the number of supplementary lines each time one line of the intermediate image signal is generated, and transferring input image signals corresponding to the number of supplementary lines from the input supplementation buffer to the input data buffer.

20. The image processing method according to claim 19, wherein the input image signal includes R, G and B signals and is processed by pipelining.

* * * * *

UNITED STATES PATENT AND TRADEMARK OFFICE
CERTIFICATE OF CORRECTION

PATENT NO.         : 8,888,296 B2
APPLICATION NO.    : 13/421540
DATED              : November 18, 2014
INVENTOR(S)        : Yutaka Ota et al.

Page 1 of 1

It is certified that error appears in the above-identified patent and that said Letters Patent is hereby corrected as shown below:

In the specification,

In column 5 at line 24, Change "$(-P_x, -P_r)$" to --$(-P_x, -P_y)$--.

Signed and Sealed this
Twentieth Day of October, 2015

Michelle K. Lee
*Director of the United States Patent and Trademark Office*